US011989951B2

(12) United States Patent
Liu

(10) Patent No.: US 11,989,951 B2
(45) Date of Patent: May 21, 2024

(54) PARKING DETECTION METHOD, SYSTEM, PROCESSING DEVICE AND STORAGE MEDIUM

(71) Applicant: BOE Technology Group Co., Ltd., Beijing (CN)

(72) Inventor: Tong Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 668 days.

(21) Appl. No.: 17/263,537

(22) PCT Filed: Apr. 30, 2020

(86) PCT No.: PCT/CN2020/088437
§ 371 (c)(1),
(2) Date: Jan. 26, 2021

(87) PCT Pub. No.: WO2021/217625
PCT Pub. Date: Nov. 4, 2021

(65) Prior Publication Data
US 2021/0342606 A1 Nov. 4, 2021

(51) Int. Cl.
G08G 1/14 (2006.01)
G06V 20/56 (2022.01)
G06V 20/58 (2022.01)

(52) U.S. Cl.
CPC .......... *G06V 20/586* (2022.01); *G06V 20/588* (2022.01); *G08G 1/147* (2013.01); *G08G 1/148* (2013.01)

(58) Field of Classification Search
CPC .... G06V 20/586; G06V 20/588; G08G 1/147; G08G 1/148; G08G 1/0116; G08G 1/0137; G08G 1/0175; G08G 1/04; Y02T 10/40
See application file for complete search history.

(56) References Cited

U.S. PATENT DOCUMENTS

2018/0165813 A1  6/2018 Mai
2018/0288371 A1* 10/2018 Nose ................. G06T 3/053
2021/0192952 A1*  6/2021 Silas ................. H04W 4/021

FOREIGN PATENT DOCUMENTS

CN     206097471 U    4/2017
CN     108698550 A   10/2018
CN     208329798 U    1/2019
CN     110853366 A    2/2020

* cited by examiner

Primary Examiner — Chuong A Ngo
(74) Attorney, Agent, or Firm — Ling Wu; Stephen Yang; Ling and Yang Intellectual Property

(57) ABSTRACT

A parking detection method, a system, a processing device and a storage medium are provided. The parking detection method includes: acquiring an image to be detected; acquiring a projection area of a vehicle on the ground according to vanishing points and a vanishing line in the image to be detected in combination with outline key points of the vehicle in the image to be detected; judging whether the vehicle is parked regularly.

16 Claims, 4 Drawing Sheets

PARKING DETECTION METHOD, SYSTEM, PROCESSING DEVICE AND STORAGE MEDIUM

TECHNICAL FIELD

Embodiments of the present disclosure relate to but are not limited to the field of image processing, in particular to a parking detection method, system, processing device and storage medium.

BACKGROUND

With the development of society, the number of urban vehicles is increasing, and the parking problem is becoming more and more serious.

In residential, public or internal parking lots, parking is irregular due to various reasons, especially a situation of vehicles going beyond a parking space will lead to disordered parking space management, ineffective parking, and even scratches or other accidents. If real-time inspection is done manually, it will obviously waste manpower and time.

SUMMARY

The following is a summary of subject matter described in detail herein. This summary is not intended to limit the protection scope of the claims.

On the one hand, an embodiment of the present disclosure provides a parking detection method, which comprises: acquiring an image to be detected; acquiring projection area information of the vehicle on the ground according to the vanishing points and the vanishing line of the parking lines in the image to be detected in combination with the outline key points of the vehicle in the image to be detected; judging whether the vehicle is parked regularly.

On the other hand, an embodiment of the present disclosure also provides a processing device, which comprises a memory, a processor and a computer program stored in the memory and executed on the processor, and the steps in the parking detection method as described above are achieved when the processor executes the program.

On the other hand, an embodiment of the present disclosure also provides a parking detection system, which comprises an image acquisition device and the processing device as described above.

In a fourth aspect, an embodiment of the present disclosure also provides a computer-readable storage medium storing executable instructions, when the executable instructions are executed by a processor, the parking detection method as described in any one of the above is implemented.

Of course, it is not necessary to achieve all of the advantages mentioned above to implement any product or method of the present disclosure. Other features and advantages of the present disclosure will be set forth in the following embodiments of the specification, or be learned by the implementations of the present disclosure. Purposes and other advantages of the embodiments of the present disclosure may be achieved and obtained by structures specified in the specification, claims and drawings.

Other aspects will become apparent upon reading and understanding accompanying drawings and the detailed description.

DESCRIPTION OF DRAWING

Accompanying drawings are used to provide a further understanding of technical solutions of the present disclosure, form a part of the specification, and explain technical solutions of the present disclosure together with embodiments of the present disclosure, while they do not constitute a limitation on the technical solutions of the present disclosure. Shapes and sizes of the components in the drawings do not reflect true proportions, and the purpose is only for schematically describing contents of the present disclosure.

DETAILED DESCRIPTION

A plurality of embodiments are described in the present disclosure, but the description is exemplary rather than limiting, and there may be more embodiments and implementation solutions within the scope of the embodiments described in the present disclosure. Although many possible combinations of features are shown in the accompanying drawings, and discussed in the specific implementations, many other combination modes of the disclosed features are also possible. Unless specifically limited, any feature or element of any embodiment may be used in combination with or may replace any other feature or element of any other embodiment.

When describing representative embodiments, the specification may have presented methods and/or processes as a specific sequence of steps. However, to the extent that the method or process does not depend on the specific order of steps described herein, the method or process should not be limited to the specific order of steps described. As one of ordinary skill in the art will understand, other sequences of steps are also possible. Therefore, the specific order of steps set forth in the specification should not be interpreted as limiting the claims. In addition, the claims for the method and/or process should not be limited to performing their steps in the written order, and those of skilled in the art may readily understand that these orders may vary and still remain within the spirit and scope of the embodiments of the present application.

Unless otherwise defined, technical terms or scientific terms used in the embodiments of the present disclosure shall have common meanings as construed by those of ordinary skills in the art to which the present disclosure pertains. The words "first", "second" and the like used in the embodiments of the present disclosure do not represent any order, quantity or importance, but are merely used to distinguish among different components. Similar words such as "including" or "containing" mean that elements or articles appearing before the word cover elements or articles listed after the word and their equivalents, and do not exclude other elements or articles. Similar words such as "connected" or "connected" are not limited to physical or mechanical connections, but may include electrical connections, whether direct or indirect.

Figure 1:
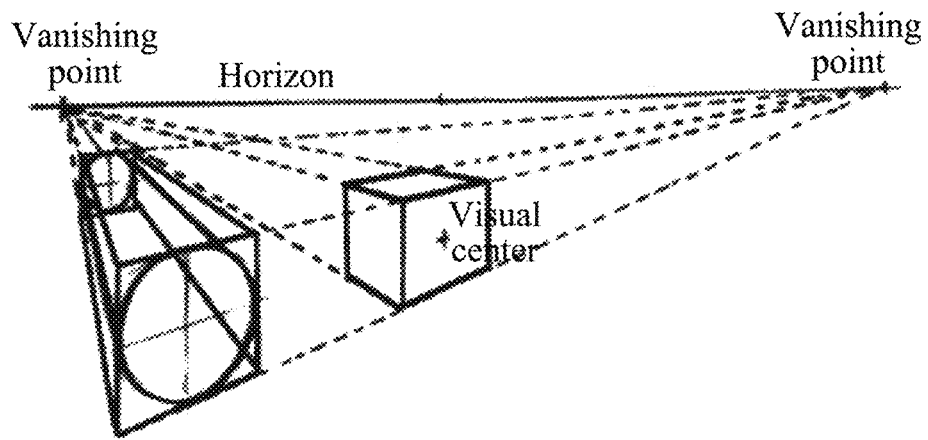
FIG. 1 is a schematic diagram of vanishing points and horizontal lines in a perspective projection mode.
Figure 2:
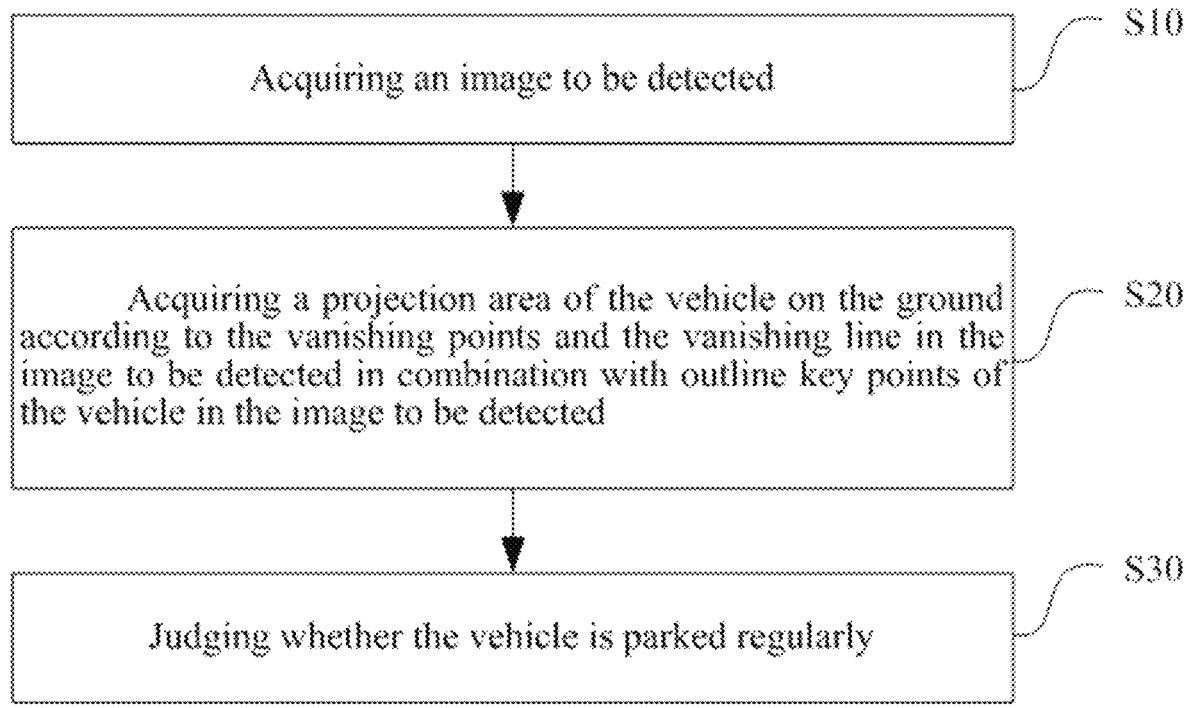
FIG. 2 is a flowchart of a parking detection method according to an embodiment of the present disclosure.

As shown in FIG. 1, in the perspective projection model, the image formed by two parallel lines will intersect at a point on an imaging plane, the point is called vanishing point. The vanishing points corresponding to parallel lines in different directions are on a straight line, the straight line is called a vanishing line or a horizontal line. Therefore, in an exemplary embodiment, as shown in FIG. 2, parking detection may be performed by the following method:

Step 10 (S10), acquiring an image to be detected;

The image to be detected may be an image of a parking area, which may be acquired from an image acquisition device (such as a camera) arranged in the parking area.

Step 20 (S20), acquiring projection area information of the vehicle on the ground according to the vanishing points and the vanishing line of the parking lines in the image to be detected in combination with outline key points of the vehicle in the image to be detected;

Based on the vanishing point principle as described above, after determining the vanishing line in the image to be detected, then the projection area information of the vehicle on the ground is determined in combination with the outline key points of the vehicle in the image to be detected.

The projection area information includes, for example, but is not limited to the coordinates of the outline key points of the vehicle contacting with a contact surface on the ground, or coordinate information of vehicle frame lines (or projection lines) formed by connecting the outline key points of the vehicle contacting with the contact surface on the ground.

Step 30 (S30), judging whether the vehicle is parked regularly.

Whether the parking is regular is judged according to a projection area of the vehicle on the ground.

The outline key points of the vehicle which are blocked in the image may be calculated by combining the vanishing points and the vanishing line with visible outline key points in the image, and then the projection area information of the vehicle on the ground may be acquired, thus it can be determined whether the vehicle is parked regularly according to the projection area and the positions of the parking lines.

In an exemplary embodiment, Step 20 may include the following steps:

Step 201, determining the parking lines in the image to be detected, determining the vanishing points and the vanishing line of the parking lines according to the parking lines, and detecting visible outline key points of the vehicle in the image to be detected;

Step 202, determining the projection area information of the vehicle on the ground according to the visible outline key points of the vehicle and the vanishing line.

Optionally, Step 202 may include the following steps:

Step 2021, determining vanishing points of the vehicle according to the visible outline key points of the vehicle, and determining a portion of the outline key points of the vehicle which are blocked in the image to be detected according to the vanishing points of the vehicle.

Step 2022, acquiring projection area information of the vehicle on the ground according to the visible outline key points of the vehicle and the determined portion of the blocked outline key points of the vehicle.

In an exemplary embodiment, it is possible that, there are three visible outline key points on the positions the vehicle contacting the ground (such as wheel position) in the image to be detected. By calculating intersection points of these three known outline key points at the bottom of the vehicle and the vanishing line, the vanishing points of the vehicle may be determined, and further another blocked outline key point at the bottom of the vehicle may be determined, given the known four outline key points on the positions the vehicle contacting the ground, the projection area position of the vehicle on the ground may be determined.

In another exemplary embodiment, it is possible that if there are one or two outline key points on the positions the vehicle contacting the ground in the image to be detected, then lines of vehicle body frame may be obtained by using the outline key points in the middle of the vehicle and then the lines of vehicle body frame are translated, for example, a border line of the frame lines covers the outline key points at the wheels, while another border line on the other direction covers the key points of the front or the rear of the vehicle, and the translated lines of the vehicle body frame may be used as the projection area of the vehicle on the ground.

In an exemplary embodiment, Step 30 may include judging whether the vehicle is parked regularly according to the parking lines and the projection area of the vehicle on the ground.

In an exemplary embodiment, judging whether the vehicle parks regularly includes any one or more of the following judgments:

judging whether the vehicle presses the parking line(s);
judging whether the parking angle of the vehicle is within a preset angle offset range;
judging whether the center of gravity of the vehicle is within a preset center-of-gravity offset range.

Any one or more of the above judgments may be selected as needed.

In an exemplary embodiment, judging whether the vehicle presses the parking line(s) includes any one or more of the following judgments:

judging whether the projection lines of the vehicle on the ground coincide with the parking lines, and if so, the vehicle is considered to press the parking line(s);
judging whether the projection lines of the vehicle on the ground intersect with the parking lines, and if so, the vehicle is considered to press the parking line(s);
judging whether the outline key points at the bottom of the vehicle are located on the parking lines, and the vehicle is considered to press the parking line(s) as long as one outline key point is located on the parking lines;
judging whether the outline key points of the vehicle at the bottom of the vehicle are located outside of the parking line, and as long as one outline key point is located outside of the parking line, the vehicle is considered to press the parking line(s).

In an exemplary embodiment, judging whether the parking angle of the vehicle is within a preset angle offset range comprises:

judging whether the parking angle of the vehicle is within the preset angle offset range by the slopes of the parking lines and the slopes of the projection lines of the vehicle on the ground; or
judging whether the parking angle of the vehicle is within the preset angle offset range according to the positions of the vanishing points of the parking lines and the positions of the vanishing points of the vehicle.

In an exemplary embodiment, judging whether the center of gravity of the vehicle is within a preset center-of-gravity offset range includes: judging whether the center of gravity of the vehicle is within the preset center-of-gravity offset range according to the offset between the center of gravity of the vehicle in the projection area on the ground and the center of gravity of the parking area formed by the parking lines.

Regarding any area (a vehicle projection area or parking area), the center of gravity of the area may be calculated by one of the following methods:

- taking the average value of abscissas of all pixels in the area as the abscissa of the center of gravity of the area, and taking the average value of ordinates of all pixels in the area as the ordinate of the center of gravity of the vehicle;
- taking the average value of abscissas of all pixels on border lines of the area as the abscissa of the center of gravity of the area, and taking the average value of ordinates of all pixels on border lines of the area as the ordinate of the center of the gravity of the vehicle;
- taking the coordinate of the intersection of the diagonals in the area as the coordinate of the center of gravity of the vehicle.

In this way, the information of the parking area is compressed to the center of gravity of parking area, and the information of the projection area is compressed to the center of gravity of the projection area, and thus the position of the area may be measured simply and accurately.

Figure 3:
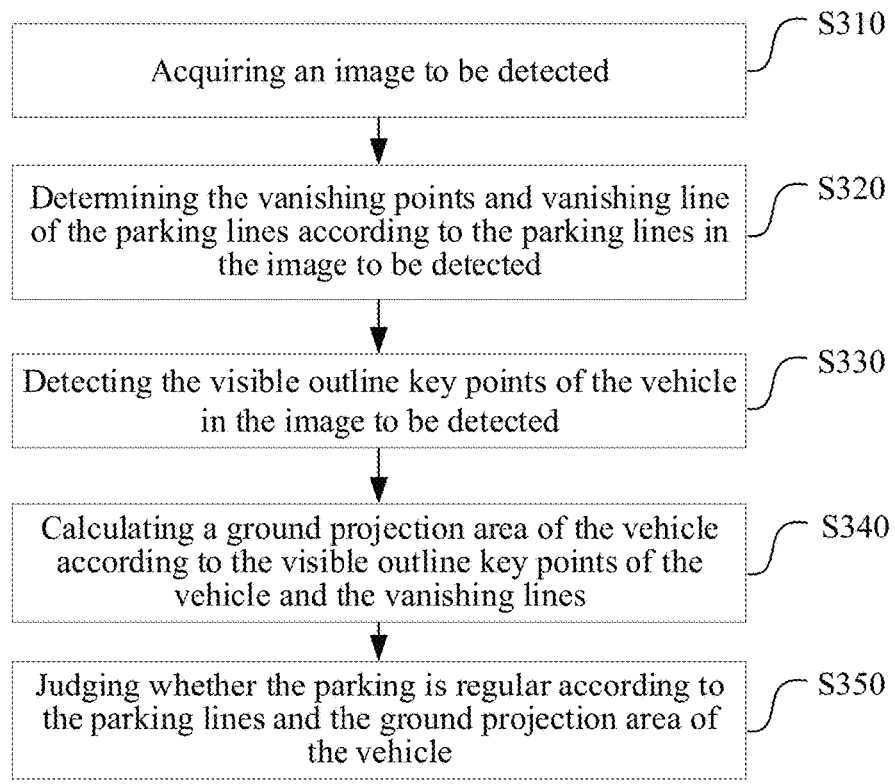
FIG. 3 is a flowchart of another parking detection method according to an embodiment of the present disclosure.

As shown in FIG. 3, in an exemplary embodiment, a parking detection method is provided, which includes the following steps S310 to S350, wherein:

Step 310 (S310), acquiring an image to be detected;

The image to be detected can be acquired from an image acquisition device (such as a camera) arranged in parking areas. The camera may be fixed on a fixed structure, such as a street lamp post, a wall outside a building or a special pan-tilt-zoom. In an exemplary embodiment, the image acquisition device may periodically acquire an image of a parking area as the image to be detected. In another exemplary embodiment, the image acquisition device can take picture of a certain parking area according to a command of a processing device, for example, when a sensor device detects that a vehicle has just been parked in the certain parking area, or when the processing device recognizes that a vehicle has just been parked in the certain parking area according to image recognition technology, the command to take picture of the parking area is sent to the image acquisition device, and the image acquisition device can take picture of the parking area according to the command of the processing device or the triggering of the sensor device to obtain the image to be detected.

The processing device may be disposed in the image acquisition device, or may be located in a cloud server. When the processing device is set into in the image acquisition device, the image to be detected which is acquired by the image acquisition device can be directly calculated and processed, and perform parking regularization detection, when irregular parking is found, the processing device can notify a back-end parking manager, or send a voice prompt to the driver of the vehicle by a voice playback device installed in the parking area. When the processing device is located in the cloud server, the image acquisition device sends the image to be detected to the processing device located in the cloud server, the processing device calculates and processes the image to be detected, and performs parking regularization detection, when irregular parking is found, a notification may be sent to the parking lot where the image acquisition device is located. When the processing device is located in the cloud server, it can detect and process a plurality of images to be detected sent by a plurality of image acquisition devices, which may be located in the same parking lot or in a plurality of parking lots, and an identification of an image acquisition device may be bound with an identification of a parking lot which the image acquisition device is located, so that the processing device can send a notification to the parking lot corresponding to the image acquisition device.

Step 320 (S320), determining the vanishing points and vanishing line of the parking lines according to the parking lines in the image to be detected;

The parking lines in the image to be detected may be determined by image detection of the image to be detected acquired in Step 101, or by detecting an image of the parking area without parking, which is at the same viewing angle as the image to be detected. The image of the parking area without parking which is at the same viewing angle as the image to be detected may be captured in advance, and the detection of the parking lines may be completed in advance.

The following way may be used to determine the parking lines in the image: using Hough transformation to detect linear segments in the image and cluster the line segments. In an exemplary embodiment, in order to avoid noise interference, the line segments of which the length is less than a preset length threshold may be removed, and then the remaining line segments are clustered based on slopes, and different groups of line segments with similar slope values are selected, that is, each group of line segments includes multiple line segments, and the slopes of these line segments are similar (within a small range). Taking a quadrilateral parking space with four parking lines as an example, the slopes of two opposite parking lines in the four parking lines are similar. Therefore, for such parking space, two groups of line segments may be selected, in combination with slope values and prior information (such as the estimated parking line direction), the line segments in one group may be used as, for example, parking lines in horizontal direction, while the line segments in the other group may be used as, for example, parking lines in vertical direction, and then the positions of the parking lines in each parking space may be determined according to coordinates of the line segments in the image. In an exemplary embodiment, before clustering the slopes of the remaining line segments as described above, in order to avoid noise interference, the line segments may be filtered according to a slope range of the parking lines in the image which is captured in advance when there is no vehicle parked, and then the line segments within the slope range of the parking lines are selected for clustering.

Figure 4:
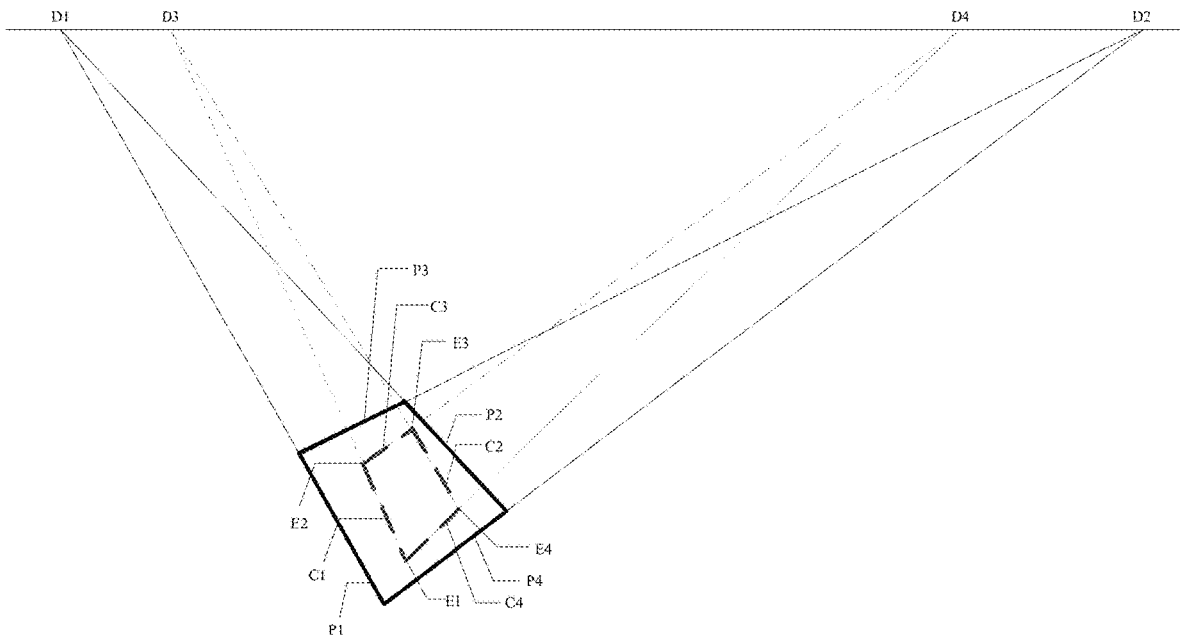
FIG. 4 is a schematic diagram of the plane relationship between a parking area, a vehicle projection area and vanishing points as well as a vanishing line according to an embodiment of the present disclosure.

As shown in FIG. 4, the determined parking lines of any parking space include a first parking line P1, a second parking line P2, a third parking line P3 and a fourth parking line P4, it is assumed that the first parking line P1 and the second parking line P2 are in a similar direction, i.e., the slopes are similar, the third parking line P3 and the fourth parking line P4 are in a similar direction, and the lengths of the first parking line P1 and the second parking line P2 are both greater than those of the third parking line P3 and the fourth parking line P4, the intersection of the extension lines of the first and second parking lines is calculated as the first parking line vanishing point (hereinafter referred to as the first vanishing point) D1, and the intersection of the extension lines of the third and fourth parking lines is calculated as the second packing line vanishing point (hereinafter referred to as the second vanishing point) D2. The line obtained by connecting the first vanishing point D1 and the second vanishing point D2 is the vanishing line.

One of the following methods may be used to calculate the intersection of two straight lines:

Method 1: achieving the following calculations by writing a function: calculating the slope k1 and intercept b1 of a first straight line according to any two points on the first straight line, thus to obtain an equation expression of the first straight line; similarly, calculating the slope k2 and intercept b2 of a second straight line, thus to obtain an equation expression of the second straight line, and obtaining the intersection of the first straight line and the second straight line by solving the binary linear equations.

Method 2: Finding the intersection of two straight lines by using the function in an opencv.

Step 330 (S330), detecting the visible outline key points of the vehicle in the image to be detected;

The execution sequence of this step and step S320 is not limited.

Figure 5:
FIG. 5 is a vehicle parking image captured by an image acquisition device according to an embodiment of the present disclosure.

The outline key points include some edge points of the outer contour of the vehicle, such as the lower edges of wheels (the positions where the wheels contact the ground), the lower edges of the front and rear bumpers, etc., as shown by the white dots in the picture shown in FIG. 5. In an exemplary embodiment, for an outline key points, rules for identifying attribute value of the outline key point may be preset, for example, attribute value of the outline key point may be set to include an overall serial number attribute value N for marking identification (ID) of the outline key point, a height attribute value L for identifying a height level to which the outline key point belongs, and a position attribute value S for identifying which side of the vehicle the outline key point belongs to. Among them, the height attribute value L may be obtained according to a preset height level, for example, L=1, 2, . . . or, 1, and the height level of the outline key points located at the lower edge of the wheels may be set as the lowest, and the height level of outline key points located at the roof may be set as the highest. The position attribute value S may be defined according to which side of the vehicle the outline key point belongs to, for example, it can be recorded as S=1,2,4, or 8, where 1 may indicate that the first side is for example, the left side of the vehicle (where the driver is located), 2 may indicate that the second side is for example, the right side of the vehicle (the front passenger seat side), 4 may indicate that the third side is for example, the front side of the vehicle, and 8 may indicate that the fourth side is for example, the rear side of the vehicle. The outline key point at the corner may belong to both sides at the same time, for example, for the outline key point belonging to the right side and the rear side at the same time, its position attribute value S is 10, i.e. 2+8.

In an exemplary embodiment, the positions and the attribute values of outline key points may be obtained by using convolutional neural network. Convolutional neural network is a multi-layer neural network, which is good at processing machine learning problems related to images, especially large images. Convolutional neural network can gradually reduce dimensions of image recognition problems having huge amount of data by a series of methods, and finally the convolutional neural network can be trained. The vehicle image is captured in advance, which may include the vehicle image captured on site or may include a public vehicle image data set, the positions and the attribute values of the outline key points of the vehicle in the vehicle image are demarcated, and the convolutional neural network is trained to detect these outline key points. After the convolutional neural network is trained and an image to be detected is input into the convolutional neural network, the convolutional neural network can output the positions (e.g., coordinates) and the attribute values of the outline key points.

In an exemplary embodiment, SSD (Single Shot Multi-Box Detector) algorithm may be used, which is a target detection algorithm, the SSD is mainly aimed at applying convolution kernel on a characteristic image to predict categories and offset amounts of a series of default bounding boxes. SSD is a method that draws lessons from the idea of target detection algorithm YOLO (You Only Look Once) and Faster R-CNN based on deep learning, thereby achieving fast target detection speed and high target detection accuracy.

For example, the convolution kernels of m×n may be preset, and the convolution result of m×n can be obtained by performing convolution operation on the vehicle image (which may be understood as having a sliding window, multiplying a convolution kernel with a corresponding image pixel and then summing up). This process may be understood as using a filter (a convolution kernel) to filter each small area of an image, so as to get characteristic values of these small areas. The value of the convolution kernel is learned in the learning process. By continuous deep learning, an outline key point detection model with the fastest speed and highest accuracy for vehicle image detection may be formed.

In addition to using SSD algorithm, in another exemplary embodiment, YOLO(YOLO V3) of the third version may be used, which is also a target detection algorithm and can achieve outline key point detection. YOLO V3 is a full convolution network, which uses a lot of skip-layer connections of residuals, in each layer of residual structure, after an input is convolved, the generated characteristic image is superimposed with the input and then is input to the next layer as a new input, which reduces the risk of gradient explosion and enhances the learning ability of the network. YOLO V3 has three scales of outputs, and an output of each scale includes coordinates, confidence and category information, and the category information includes attribute values.

The target detection algorithm after training is input with the vehicle image, then the coordinates and the attribute values of the outline key points of the vehicle in the vehicle image may be output.

In an exemplary embodiment, in order to narrow detection range, reduce calculation amount and improve detection speed, before using the target detection algorithm to detect the outline key points of the vehicle, the image to be detected may be preprocessed in any of the following modes:

Mode 1: obtaining the pixel-level segmentation result of the vehicle by modeling the background.

An image of a parking space without vehicle parked may be captured in advance, before the outline key points of the vehicle in a certain parking space need to be detected, an image of this parking space without parked vehicle which is captured at the same position angle is extracted, and two images are compared and calculated, for example, the same parts may be removed, and then the segmentation result including the vehicle can be obtained, thus pixel-level segmentation of the vehicle is achieved. Thereafter, the segmentation result is input into the convolutional neural network as described before used for detecting the outline key points to perform target detection, thereby obtaining the positions and the attribute values of the vehicle outline key points.

Mode 2: obtaining the pixel-level segmentation result of the vehicle by using a divider to segment the image to be detected;

For example, an instance segmentation or semantic segmentation method may be adopted to obtain the pixel-level segmentation result including the vehicle, and then the segmentation result is input into the convolutional neural network as described above used for detecting the outline key point to proceed target detection, thus to obtain the positions and attribute values of the vehicle outline key points.

Mode 3: obtaining vehicle position range information by using a target detection method to detect the image to be detected.

The first target detection may be performed on the image to be detected to obtain approximate position range information of the vehicle in the image to be detected, that is, to obtain the bounding box of the vehicle, and then the image in the bounding box is used as an input of the convolution neural network as described above to detect the outline key points in this area;

The image to be detected is preprocessed, and if no vehicle is detected, there is no need to detect the outline key points.

Step 340 (S340), calculating a ground projection area of the vehicle according to the visible outline key points of the vehicle and the vanishing lines;

In an exemplary embodiment, the outline key points located at the bottom level closest to the ground (i.e., the outline key points at the lower edge of the wheels) may be determined according to the attribute values of the outline key points, and the outline key points located at the bottom side include three points: a first outline key point (hereinafter referred to as a first key point) E1, a second outline key point (hereinafter referred to as a second key point) E2 and a third outline key point (hereinafter referred to as a third key point) E3, it can be determined according to the attribute value of each outline key point, that the first key point E1 and the second key point E2 belong to the first side, the second key point E2 and the third key point E3 belong to the third side, then the two outline key points belonging to the same side are connected, the connecting line between the first key point E1 and the second key point E2 is a first vehicle frame line C1, and the intersection between the extension line of the first vehicle frame line C1 and the vanishing line is a first vehicle vanishing point (Hereinafter referred to as the third vanishing point, in order to distinguish with the parking line vanishing point) D3, the connecting line between the second key point E2 and the third key point E3 is a third vehicle frame line C3, and the intersection between the extension line of the third vehicle frame line C3 and the vanishing line is namely a second vehicle vanishing point (Hereinafter referred to as the fourth vanishing point) D4, the connecting line between the third vanishing point D3 and the third key point E3 and the connecting line between the fourth vanishing point D4 and the first key point E1 are determined respectively, and the intersection between the two connecting lines is calculated. This intersection is the position of the fourth outline key point E4, thus it can be determined that the connecting line between the third key point E3 and the fourth key point E4 is the second vehicle frame line C2, and the connecting line between the fourth key point E4 and the first key point E1 is the fourth vehicle frame line C4. After four vehicle frame lines are determined, the area formed by the four vehicle frame lines is the ground projection area of the vehicle, and the four vehicle frame lines are four projection lines of the vehicle on the ground.

Similarly, in another exemplary embodiment, if any three points belonging to the same level, for example, three points on the top level are known, then the vehicle vanishing points, i.e. the third vanishing point and the fourth vanishing point, may be determined, and after the vehicle vanishing points are determined, the other two points may be calculated according to any two points located at diagonal lines at the bottom level.

At step 350 (S350), judging whether the parking is regular according to the parking lines and the ground projection area of the vehicle.

When the ground projection area of the vehicle is just within the parking range defined by the parking lines, the vehicle is considered to be parked regularly. Irregular parking mainly takes the fact into consideration that the parking position of the vehicle may affect the parking in an adjacent parking space or the driving of surrounding vehicles, which may easily lead to scratching accidents. Irregular parking includes: parking line is pressed by a vehicle, the angle offset between a wheel central axis and the median of a parking space is too large, and the offset between the center of gravity of the vehicle and the center of gravity of the parking space is too large. Any one or more irregular behaviors may be detected as needed.

In an exemplary embodiment, judging whether the parking is regular includes any one or more of the following judgments:

Judgment 1: judging whether the vehicle presses lines;

whether the vehicle presses line(s) refers to whether the parking position of the vehicle presses line(s), the vehicle which presses line(s) may hinder the use for adjacent parking spaces. In an exemplary embodiment, vehicle pressing line(s) includes any one or more of the following judgments:

judging whether the vehicle frame lines coincide with the parking lines, and if so, the vehicle is considered to press line(s);

judging whether the vehicle frame line intersects with the parking line, and if so, the vehicle is considered to press line(s);

judging whether the four outline key points at the bottom level of the vehicle are located on the parking lines, and as long as one outline key point is located on the parking lines, the vehicle is considered to press line(s);

judging whether the outline key points at the bottom level of the vehicle are located outside of the parking lines, and as long as one outline key point is located outside of the parking lines, the vehicle is considered to press line(s).

In this example, the bottom of the vehicle includes four outline key points. In other embodiments, the outline key points at the bottom may be six or eight, that is, the projection points of the front and rear of the vehicle on the ground may also be included.

Judgment 2: whether the parking is inclined, namely judging whether the parking angle of the vehicle is within a preset angle offset range;

the inclination of the parking angle indicates that the angle offset between the wheel central axis and the median of the parking space is too large, the wheel central axis refers to the connecting line between the center of the front axle and the center of the rear axle of the vehicle, and the median of the parking space refers to the connecting line between the midpoints of two shorter parking lines. The excessive angle offset of the vehicle might cause the front or rear of the vehicle to protrude out of the parking area, which might cause a scratch accident. In an exemplary embodiment, any one of the following judgment methods may be adopted:

Method 1: calculating the parking line slope of the longer parking line, calculating the vehicle frame line slope of the longer vehicle frame line, and comparing the two slopes. If the angle difference between the two slopes is greater than a preset angle threshold, the angle of inclination is considered to be too large and the parking is irregular;

In an exemplary embodiment, two-sided calculation may be performed when calculating, taking FIG. 4 as an example, the slopes of the first parking line C1 and the first vehicle frame line P1 may be calculated respectively, and the two slopes are compared to get a first angle difference, the slopes of the second parking line C2 and the second vehicle frame line P2 may be calculated respectively, and the two slopes are compared to get a second angle difference, if the maximum angle difference between the first angle difference and the second angle difference is within a preset angle range, the vehicle is considered to be within the preset offset range.

Method 2: it is judged by the distance between the vanishing points of the vehicle and the vanishing points of the parking lines, taking FIG. 4 as an example, when the parking is regular, the distance between the first vanishing point D1 formed by two parking lines in the same direction and the third vanishing point D3 formed by two vehicle frame lines in the same direction as the two parking lines tends to coincide. Similarly, the smaller the distance between the fourth vanishing point and the second vanishing point is, the better, so it can be judged by either of the following two modes:

Mode 1, calculating by ratio;
calculating a parking slope R1 by the following formula: $R1=f_1((Da+Db)/Dc)$ wherein, Da represents the distance between the first parking line vanishing point and the first vehicle vanishing point, Db represents the distance between the second parking line vanishing point and the second vehicle vanishing point, Dc represents the distance between the first parking line vanishing point and the second parking line vanishing point, $f_1(\ )$ represents a first function, and the first function may be a mathematical function, such as $f_1((Da+Db)/Dc) = k*((Da+Db)/Dc)$, k is a constant, $k \in (0,1/2]$, for example, when $k=½$, $R1=(Da+Db)/2Dc$. When the parking slope R1 is within a preset first threshold (i.e., a first ratio threshold as below), it is determined that the parking angle of the vehicle is within the preset angle offset range.

Taking FIG. 4 as an example, in an exemplary embodiment, a ratio of a first vanishing distance between the first vanishing point D1 and the third vanishing point D3 to a reference vanishing distance between the first vanishing point D1 and the second vanishing point D2 and a ratio of a second vanishing distance between the second vanishing point D2 and the fourth vanishing point D4 to the reference vanishing distance may be calculated respectively, when the calculated two ratios both are within a preset first ratio threshold range, the vehicle is considered to be within the preset offset range.

In another exemplary embodiment, the ratio of the sum of the first vanishing distance and the second vanishing distance to the reference vanishing distance may be calculated, and when the calculated ratio is within a preset second ratio threshold range, the vehicle is considered to be within the preset offset range; In order to unify the dimensions, the reference vanishing distance may be mathematically processed, for example, taking two times the reference vanishing distance as a new reference vanishing distance, the ratio of the sum of the first vanishing distance and the second vanishing distance to the new reference vanishing distance is calculated, and when the calculated ratio is within a preset third ratio threshold range, the vehicle is considered to be within the preset offset range.

Mode 2, directly comparing the distance between the vehicle vanishing point of and the parking line vanishing point;

the offset range of the vehicle vanishing point may be obtained by measurement in advance, taking FIG. 4 as an example, the first offset maximum range (±x) near the first vanishing point D1 and the second offset maximum range (±y) near the second vanishing point D2 may be obtained respectively, and whether the first vehicle vanishing point, i.e. the third vanishing point D3, is within the first offset maximum range and whether the second vehicle vanishing point, i.e. the fourth vanishing point D4, is within the second offset maximum range are judged, if the third vanishing point D3 and the fourth vanishing point D4 are both within the preset range, the vehicle is considered to be within the preset offset range, and as long as one vanishing point is not within the corresponding preset range, the vehicle is considered to be not within the preset offset range, that is, an angle offset exists.

Judgment 3: whether the parking is deviated, that is, judging whether the center of gravity of the vehicle is within a preset center-of-gravity offset range;

The center-of-gravity offset of the vehicle refers to the degree of deviation between the center of gravity of the vehicle and the center of gravity of the parking space. In an exemplary embodiment, any of the following methods may be used as the judging method:

Method 1: calculating by a ratio; In an exemplary embodiment, the positions of the centers of gravity of the parking space and the vehicle may be calculated respectively, the inter-center-of-gravity distance between the center of gravity of the parking space and the center of gravity of the vehicle is calculated, and the ratio of the distance to the area of the parking space is calculated, if the calculated ratio is within a preset fourth ratio threshold range, the center-of-gravity offset of the vehicle is within a preset range; in order to unify the dimensions, the area of the parking space may be mathematically processed, for example, the square root of the area value of the parking space may be taken to obtain an average side length distance, and the ratio of the inter-center-of-gravity distance to the average side length distance is calculated, when the calculated ratio is within a preset fifth ratio threshold range, the center-of-gravity offset of the vehicle is within the preset range.

For example, a parking offset rate R2 is calculated by the following formula, and when judging that the parking offset rate is within a second threshold (the fifth ratio threshold), it is determined that the center of gravity of the vehicle is within the preset center-of-gravity offset range: $R2=Dd/f_2(P)$ wherein, Dd represents the distance between the center of gravity of the projection area of the vehicle on the ground and the center of gravity of the parking area formed by the parking lines, P represents the area of the parking space, and $f_2(\ )$ represents the second function, that is, the above mathematical processing.

Method 2: Comparing the distance between the center of gravity of the vehicle and the center of gravity of the parking lines;

The offset range of the center of gravity of the vehicle may be obtained by measurement in advance, that is, after determining the center of gravity of the parking space, the allowable offset range of the center of gravity of the vehicle may be determined by simulation or actual test, that is, when the center of gravity of the vehicle is within the offset range, the vehicle is considered to be within the preset offset range, and when the center of gravity of the vehicle is outside of the offset range, the vehicle is considered to be outside of the preset offset range.

In an exemplary embodiment, the center of gravity of the vehicle, that is, the center of gravity of the projection area of the vehicle, may be calculated by one of the following methods:

taking the average value of abscissae of all pixels in the projection area of the vehicle as the abscissa of the center of gravity of the vehicle, and taking the average value of ordinates of all pixels in the projection area of the vehicle as the ordinate of the center of gravity of the vehicle;

taking the average value of abscissae of all pixels on the projection lines of the vehicle as the abscissa of the center of gravity of the vehicle, and taking the average value of ordinates of all pixel points on the projection lines of the vehicle as the ordinate of the center of gravity of the vehicle, the projection lines of the vehicle refer to four frame lines of the vehicle forming the projection area of the vehicle;

taking the coordinate of diagonal intersections of four vertices in the projection area of the vehicle as the coordinate of the center of gravity of the vehicle.

The calculation method of the center of gravity of a parking line may refer to the above calculation method of the center of gravity of the vehicle.

In this disclosure, except for the vanishing line and the extension line as declared, the remaining vehicle frame lines, projection lines, parking lines and the like all refer to line segments.

By adopting the parking detecting method in an exemplary embodiment, whether the parking is regular is automatically detected in real time using the vanishing points, the vanishing line in combination with a computer vision detection technology to evaluate the projected position of the vehicle on the ground, which does not need manual real-time inspection, thus saving time and manpower, and has great social and economic benefits. In addition, the method in the exemplary embodiment can find out the problem of irregular parking in time and prompt the driver in time to carry out adjustment. The method in the exemplary embodiment may be combined with a roadside parking electronic toll collection system. Roadside parking electronic toll collection uses a camera to recognize the license plate of a vehicle parked on the roadside, calculates the parking time of the vehicle, and automatically bills. In order to avoid disorderly parking phenomena, for example, beyond parking space, oblique parking or straddle parking, the method in the exemplary embodiment may be used to automatically detect irregular parking phenomena, and thus the parking manager or the driver may be informed in time for timely adjustment.

Figure 6:
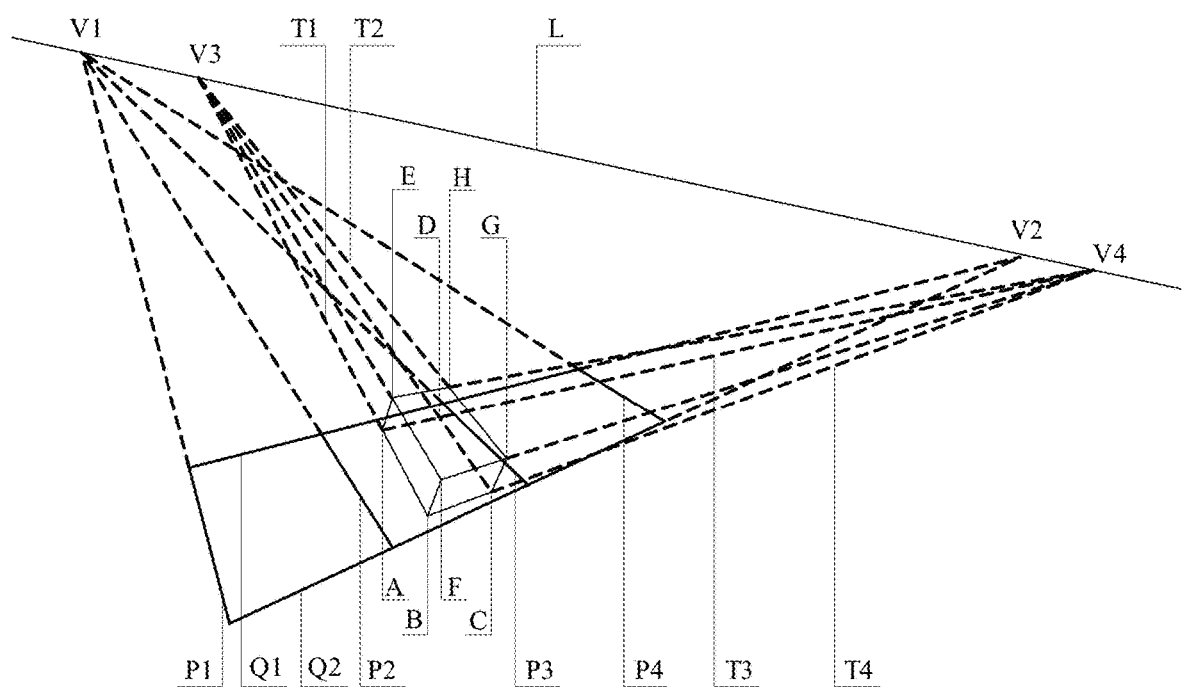
FIG. 6 is a schematic diagram of the three-dimensional relationship between parking lines, the vehicle projection area and vanishing points as well as a vanishing line according to an embodiment of the present disclosure.

The above method will be exemplified with reference to FIG. 6, in FIG. 6, P1, P2, P3 and P4 are a group of parallel parking lines, Q1 and Q2 are another group of parallel parking lines, and the sub-area formed by intersecting the two groups of parking lines is a parking space. Assuming that the vanishing point obtained by intersecting P1, ..., P4 is V1, and the vanishing point obtained by intersecting Q1 and Q2 is V2. The line L where V1 and V2 are located is the vanishing line. The rectangular block consisting of A, B, C, D, E, F, G and H in FIG. 6 represents a certain vehicle, whose projection on the ground is ABCD, the extension lines of line segments AB and CD intersect at the vanishing point V3, and the extension lines of line segments AD and BC intersect at the vanishing point V4. The point D and the parking lines Q1 and P2 are also blocked because HG and EH are blocked, which makes it impossible to directly judge whether ABCD is pressing line(s) from the image, and it is impossible to measure the offset between ABCD and the center of the parking area, as well as the depth of parallelism between the vehicle and the parking line (that is, the depth of parallelism between AB and P1 on the plane).

When an outline key point is detected in the image, which height level (L) and which side (S) of the vehicle it belongs to may be found out according to its serial number N. According to the value of S, which side or both sides of the vehicle it belongs to may be analyzed. For two outline key points belonging to the same level and same side (such as point A and point B in FIG. 6), by connecting them, a straight line T1 (the straight line where A, B and V3 are located in FIG. 6) on which one side in the projected four sides of the vehicle is located in the image may be obtained, and by extending this straight line to intersect with the vanishing line, the vanishing point (such as point V3 in FIG. 6) may be obtained, then by connecting the vanishing point with the outline key point on the other side of the vehicle (such as point C in FIG. 6), a straight line T2 (the straight line where C, D and V3 are located in FIG. 6) on which another projected straight line of the projected straight lines of vehicle is located in the image is obtained. In the same way, T3 (the straight line where A, D and V4 are located in FIG. 6) and T4 (the straight line where B, C and V4 are located in FIG. 6) as well as the vanishing point V4 may be obtained. The intersection of T2 and T3 is the position of the point D, while the quadrilateral ABCD is the ground projection area of the vehicle. When determining the projection area of the vehicle on the ground, only four outline key points where the vehicle contacts the ground may be connected, or there may be some extensions in the front and/or rear of the vehicle according to empirical values, as shown in the dashed box in FIG. 5.

How to judge whether the vehicle presses line(s), whether the angle of the vehicle is too inclined, and whether the parking position deviates too much from the center of the parking space will be explained below. In an exemplary embodiment, only one, or any two or three of the above judgments may be performed.

In an exemplary embodiment, judging whether the vehicle presses line(s) may be judged by judging whether the ground projection area of the vehicle (quadrilateral ABCD) intersects with the parking lines Q1, Q2, P2 or P3.

In an exemplary embodiment, whether the vehicle angle is inclined may be judged by a depth of parallelism between the vehicle and the parking lines using a distance between the vanishing points V3 and V4 of the vehicle and the vanishing points of the parking lines V1 and V2; for example, "a parking slope $R_1$" may be defined, which may be calculated by the following formula:

$$R_1 = \frac{D_{1,3} + D_{2,4}}{2 * D_{1,2}}$$

Where $D_{i,j}$ is the distance between $V_i$ and $V_j$ (in this example, i=1,2,3,4, j=1,2,3,4).

"2" in the above formula is used for unifying the dimensions of numerator and denominator, in other exemplary embodiments, other values may be taken as long as the corresponding thresholds are changed.

whether the parking angle is too inclined is judged by combining "the parking slope" with the empirical threshold th1 (that is, the third ratio threshold as mentioned above), when $R_1 > th_1$, the parking angle is considered to be too inclined; when $R_1 < th1$, the parking angle is considered to be regular, if V1 and V3 are closer, V2 and V4 are closer, it indicates that the vehicle is parked more properly.

In an exemplary embodiment, in order to judge the deviation degree of the vehicle (or translation degree), for example, "a parking offset rate $R_2$" (that is, the degree that the center of gravity of the vehicle deviates from the center of gravity of the parking space) may be defined, which is obtained by the ratio of the distance between the center of gravity of the ground projection area of the vehicle (quadrilateral ABCD) and the center of gravity of the parking space range (quadrilateral enclosed by Q1, Q2, P2 and P3) to the square root of the area of the parking region, namely:

$$R_2 = \frac{D_{V_c,P_c}}{\sqrt{A_p}}$$

wherein $V_c$ represents the center of gravity of the ground projection area of the vehicle, $P_c$ represents the center of gravity of the parking space and $D_{V_c,P_c}$ represents the distance between the two centers of gravity, and $A_p$ represents the area of the parking space.

Whether the vehicle deviates from the center of the parking space too much is judged by combining the "parking offset rate" with the empirical threshold th2 (i.e. the fifth ratio threshold as mentioned above), when $R_2 > th2$, the parking is deviated too much, and when $R_2 < th2$, the parking is regular.

By adopting the method in the above exemplary embodiment, it is not necessary to arrange an infrared sensor, while only the image acquisition device is used by capturing image for judging, which requires less cameras, is simple and convenient to deploy and maintain, and has lower cost.

In an exemplary embodiment of the present disclosure, a processing device is also provided. The terminal may include a processor, a memory, and a computer program stored on the memory and executed on the processor, when the processor executes the computer program, the operations performed by the terminal device in this disclosure are implemented.

Figure 7:
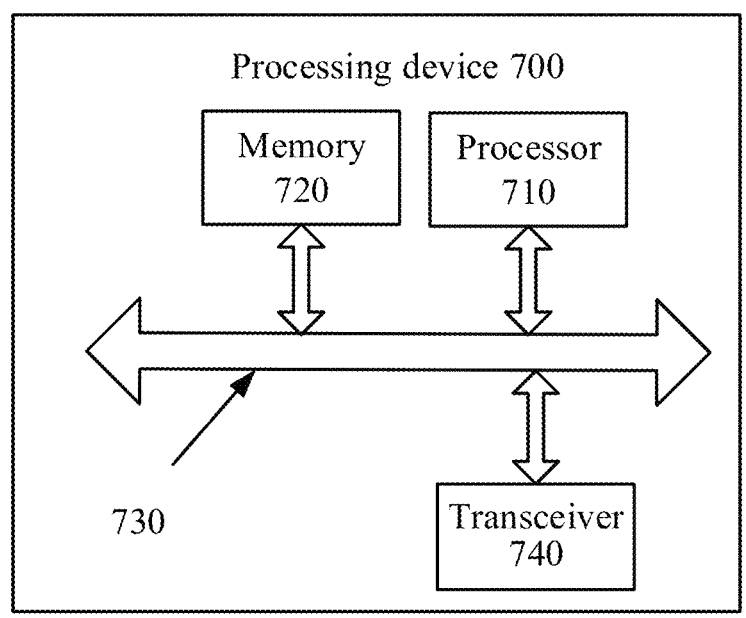
FIG. 7 is a schematic diagram of structure of a processing device according to an embodiment of the present disclosure.

As shown in FIG. 7, in an example, a processing device 700 may include a processor 710, a memory 720, a bus system 730 and a transceiver 740, wherein the processor 710, the memory 720 and the transceiver 740 are connected via the bus system 730, the memory 720 is used for storing instructions, and the processor 710 is used for executing the instructions stored in the memory 720 to control the transceiver 740 to send signals. Specifically, the transceiver can acquire the image to be detected from the image acquisition device under the control of the processor, and a notification is sent to other devices by the transceiver when irregular parking is detected.

It should be understood that the processor 710 may be a Central Processing Unit (CPU), or the processor 710 may be other general-purpose processor, a digital signal processor (DSP), an application specific integrated circuit (ASIC), a field programmable gate array (FPGA) or other programmable logic devices, a discrete gate or transistor logic device, a discrete hardware components, etc. The general-purpose processor may be a microprocessor or the processor may be any conventional processor.

The memory 720 may include a read-only memory and a random access memory, and provides instructions and data to the processor 710. A portion of the memory 720 may also include a non-volatile random access memory. For example, the memory 720 may also store information of device types.

The bus system 730 may include a power bus, a control bus, a status signal bus, and the like in addition to a data bus. However, for clarity of illustration, various buses are denoted as the bus system 730 in FIG. 7.

In the implementation process, the processing performed by the processing device may be completed by an integrated logic circuit of the hardware in the processor 710 or instructions in form of software. That is, the steps of the methods in the embodiments of the present disclosure may be implemented by a hardware processor, or the combination of the hardware in the processor and software modules. The software module can be provided in a storage medium such as a random access memory, a flash memory, a read-only memory, a programmable read-only memory, an electrically erasable programmable memory, a register etc. The storage medium is located in the memory 720, and the processor 710 reads the information in the memory 720 and completes the steps of the above methods in combination with its hardware. It will not be described in detail here to avoid repetition.

In an exemplary embodiment, a parking detection system is also provided, which comprises an image acquisition device and a processing device. The processing device may be the processing device 700 as described above. The image acquisition device may be, for example, any device capable of capturing images.

In an exemplary embodiment, a computer-readable storage medium is also provided, in which executable instructions are stored, and when the executable instructions are executed by a processor, the parking detection method provided in any of above embodiments of the present disclosure may be implemented, and the parking detection method may be used to control the parking detection system provided in above embodiments of the present disclosure to perform parking management, thereby improving the space utilization of the parking lot. The method of driving the parking detection system to perform regular parking detection by executing executable instructions is substantially the same as the parking detection method provided in the above embodiments of the present disclosure, and it will not be described in detail here.

In the description of the present disclosure, it should be understood that an orientation or position relationship indicated by the terms "middle", "upper", "lower", "front", "rear", "vertical", "horizontal", "top", "bottom", "inner", "outer" and the like is based on the orientation or position relationship shown in the accompanying drawings, which is only for the convenience of describing the present disclosure and simplifying the description, rather than indicating or implying that the apparatus or element referred to must have the specific orientation, or be constructed and operated in the specific orientation, and thus cannot be interpreted as a limitation on the present disclosure.

In the description of embodiments of the present disclosure, unless otherwise clearly specified and defined, the terms "install", "connect", "couple" should be broadly interpreted, for example, it may be connected fixedly or connected detachably, or integrated; it may be a mechanical connection or an electrical connection; it may be directly connected, or may be indirectly connected through an intermediary, or may be an internal connection between two elements. Those of ordinary skill in the art can understand the specific meanings of the above mentioned terms in the present disclosure according to specific situations.

Those of ordinary skill in the art will understand that all or some of the steps, systems, and functional modules/units in the apparatuses disclosed above may be implemented as software, firmware, hardware, and appropriate combinations thereof. In hardware implementations, the division between functional modules/units mentioned in the above description does not necessarily correspond to the division of physical components. For example, a physical component may have multiple functions, or a function or step may be performed by several physical components in cooperation. Some or all of the components may be implemented as software executed by a processor, such as a digital signal processor or a microprocessor, or as hardware, or as an integrated circuit, such as an application specific integrated circuit. Such software may be distributed on computer readable media, which may include computer storage media (or non-transitory media) and communication media (or transitory media). As is well known to those of ordinary skill in the art, the term computer storage media includes volatile and nonvolatile, removable and non-removable media implemented in any method or technology for storing information (such as computer readable instructions, data structures, program modules or other data). Computer storage media include, but are not limited to, RAM, ROM, EEPROM, flash memory or other memory technologies, CD-ROM, digital versatile disk (DVD) or other optical disk storage, magnetic cassettes, magnetic tapes, magnetic disk storage or other magnetic storage devices, or any other media that can be used to store desired information and can be accessed by a computer. Furthermore, it is well known to those of ordinary skill in the art that communication media typically contain computer readable instructions, data structures, program modules, or other data in a modulated data signal such as a carrier wave or other transmission mechanism, and may include any information delivery medium.

Although implementations disclosed in the present disclosure are as the above, the described contents are only implementations used for facilitating understanding the present disclosure, and are not used to limit the present disclosure. Any person skilled in the art to which the present disclosure pertains may make any modifications and variations in the form and details of implementation without departing from the spirit and the scope of the present disclosure, but the patent protection scope of the present disclosure shall still be subject to the scope defined in the appended claims.

What is claimed is:

1. A parking detection method, comprising:
    acquiring an image to be detected;
    acquiring projection area information of a vehicle on a ground according to vanishing points and a vanishing line of parking lines in the image to be detected in combination with outline key points of the vehicle in the image to be detected; and
    judging whether the vehicle is parked regularly,
    wherein acquiring the projection area information of the vehicle on the ground according to the vanishing points and the vanishing line of the parking lines in the image to be detected in combination with the outline key points of the vehicle in the image to be detected comprises:
    determining the parking lines in the image to be detected, determining the vanishing points and the vanishing line of the parking lines according to the parking lines, and detecting visible outline key points of the vehicle in the image to be detected; and
    determining the projection area information of the vehicle on the ground according to the visible outline key points of the vehicle and the vanishing line,
    wherein determining the projection area information of the vehicle on the ground according to the visible outline key points of the vehicle and the vanishing line comprises:
    determining vanishing points of the vehicle according to the visible outline key points of the vehicle and the vanishing line, and determining blocked outline key points of the vehicle in the image to be detected according to the vanishing points of the vehicle; and
    obtaining the projection area information of the vehicle on the ground according to the visible outline key points of the vehicle and the determined blocked outline key points of the vehicle.

2. The parking detection method according to claim 1, wherein judging whether the vehicle is parked regularly comprises:
    judging whether the vehicle is parked regularly according to the parking lines and the projection area of the vehicle on the ground.

3. The parking detection method according to claim 2, wherein judging whether the vehicle is parked regularly comprises any one or more of following judgments:
    judging whether the vehicle presses at least one of the parking lines;
    judging whether a parking angle of the vehicle is within a preset angle offset range;
    judging whether a center-of-gravity of the vehicle is within a preset center-of-gravity offset range.

4. A processing device, comprising: a memory, a processor and a computer program stored on the memory and executable by the processor, wherein steps of the method according to claim 2 are implemented when the processor executes the program.

5. The parking detection method according to claim 1, wherein detecting the visible outline key points of the vehicle in the image to be detected comprises:
    detecting the visible outline key points of the vehicle in the image to be detected by using a target detection algorithm, and outputting results including positions and attribute values of the visible outline key points of the vehicle, wherein the attribute values include identifications of the outline key points of the vehicle, height attribute values and position attribute values, wherein the height attribute values are used to identify a height level to which the outline key points of the vehicle belong, and the position attribute values are used to identify which side of the vehicle the outline key points of the vehicle belong to.

6. The parking detection method according to claim 5, wherein before detecting the visible outline key points of the vehicle in the image to be detected, the method further comprises:
    preprocessing the image to be detected to obtain a pixel-level segmentation result of the vehicle or position range information of the vehicle.

7. The parking detection method according to claim 1, wherein before detecting the visible outline key points of the vehicle in the image to be detected, the method further comprises:

preprocessing the image to be detected to obtain a pixel-level segmentation result of the vehicle or position range information of the vehicle.

8. The parking detection method according to claim 1, wherein judging whether the vehicle is parked regularly comprises any one or more of following judgments:
   judging whether the vehicle presses at least one of the parking lines;
   judging whether a parking angle of the vehicle is within a preset angle offset range;
   judging whether a center-of-gravity of the vehicle is within a preset center-of-gravity offset range.

9. The parking detection method according to claim 8, wherein judging whether the vehicle presses at least one of the parking lines comprises any one or more of following judgments:
   judging whether projection lines of the vehicle on the ground coincide with at least one of the parking lines, and if so, the vehicle is determined to press at least one of the parking lines;
   judging whether the projection lines of the vehicle on the ground intersect with at least one of the parking lines, and if so, the vehicle is determined to press at least one of the parking lines;
   judging whether the outline key points at a bottom level of the vehicle are located on at least one of the parking lines, and as long as one outline key point is located on at least one of the parking lines, the vehicle is determined to press at least one of the parking lines;
   judging whether the outline key points at the bottom level of the vehicle are located outside of the parking lines, and as long as one outline key point is located outside of the parking lines, the vehicle is determined to press the parking lines.

10. The parking detection method according to claim 8, wherein judging whether the parking angle of the vehicle is within the preset angle offset range comprises:
    judging whether the parking angle of the vehicle is within the preset angle offset range by slopes of the parking lines and slopes of projection lines of the vehicle on the ground; or
    judging whether the parking angle of the vehicle is within the preset angle offset range according to positions of the vanishing points of the parking lines and positions of vanishing points of the vehicle.

11. The parking detection method according to claim 10, wherein judging whether the parking angle of the vehicle is within the preset angle offset range according to the positions of the vanishing points of the parking lines and the positions of the vanishing points of the vehicle comprises:
    using a following formula to calculate a parking slope $R1$, and when the parking slope is judged to be within a first threshold range, determining the parking angle of the vehicle is within a preset angle offset range: $R1=k*((Da+Db)/Dc)$,
    wherein $Da$ represents a distance between a first vanishing point of a parking line and a first vanishing point of the vehicle, $Db$ represents a distance between a second vanishing point of a parking line and a second vanishing point of the vehicle, $Dc$ represents a distance between the first vanishing point of the parking line and the second vanishing point of the parking line, $k$ is a constant, $k\in(0,1/2]$.

12. The parking detection method according to claim 8, wherein judging whether the center-of-gravity of the vehicle is within the preset center-of-gravity offset range comprises:
    judging whether the center of gravity of the vehicle is within the preset center-of-gravity offset range according to a deviation of a center of gravity of the projection area of the vehicle on the ground from a center of gravity of a parking area formed by the parking lines.

13. The parking detection method according to claim 12, wherein judging whether the center-of-gravity of the vehicle is within the preset center-of-gravity offset range according to the deviation of the center of gravity of the projection area of the vehicle on the ground from the center-of-gravity of the parking area formed by the parking lines comprises:
    using a following formula to calculate a parking offset rate $R2$, and when the parking offset rate is judged to be within a second threshold range, the center-of-gravity of the vehicle is determined to be within the preset center-of-gravity offset range: $R2=Dd/f(P)$,
    wherein $Dd$ represents a distance between the center-of-gravity of the projection area of the vehicle on the ground and the center-of-gravity of the parking area formed by the parking lines, $P$ represents area of a parking space, and $f(x)=\sqrt{x}$.

14. A processing device, comprising: a memory, a processor and a computer program stored on the memory and executable by the processor, wherein steps of the method according to claim 1 are implemented when the processor executes the program.

15. A parking detection system, comprising: an image acquisition device and the processing device according to claim 14.

16. A non-transitory computer readable storage medium storing computer executable instructions for performing the method according to claim 1.

* * * * *